Patented June 8, 1954

2,680,763

UNITED STATES PATENT OFFICE 2,680,763

PREPARATION OF PRODUCTS DERIVED FROM CARBON MONOXIDE AND MONO-OLEFINS

Merlin M. Brubaker, Chadds Ford, Pa., assignor to E. I. du Pont de Nemours and Company, Wilmington, Del., a corporation of Delaware No Drawing. Application June 4, 1949, Serial No. 97,320

4 Claims. (Cl. 260—487)

This invention relates to the reaction of monoolefins with carbon monoxide and one or more other reactants to be described hereinafter. This application is a continuation-in-part of my copending application S. N. 552,374, filed September 1, 1944, now abandoned, which in turn is a continuation-in-part of my earlier application S. N. 449,765, which was filed on July 4, 1942, now abandoned.

According to this invention, a monoolefin is reacted with carbon monoxide and a reactant which is a substance capable of acting as a chain transfer agent in the presence of a catalyst capable of generating free radicals, i. e., a catalyst, other than a Friedel-Crafts catalyst, which is effective for polymerizing ethylene to solid polymers. A chain transfer agent is a substance which effects a chain transfer, as set forth in "Reactions at Carbon-Carbon Double Bonds" by C. C. Price, Interscience Publishers, N. Y., 1946, page 82.

In carrying out the process of this invention using a typical monoolefin, e. g. ethylene, with carbon monoxide and a typical chain transfer agent such as carbon tetrachloride, chloroform, a thiol, etc., it is preferred to operate under superatmospheric pressure. Equipment capable of withstanding pressure must accordingly be provided when operating under the preferred conditions. A suitable apparatus is a pressure reactor capable of being heated, and equipped with means for agitating the reactants, with an inlet line for admitting mixed monoolefin-carbon monoxide gas, a vent connecting with a rupture disc, and a pressure gage. The chain transfer agent, in a preferred embodiment, is charged into the reactor, along with an inert solvent (if one is desired) such as benzene and a catalyst capable of generating free radicals, e. g. an azo compound, a peroxy compound etc. The reactor is then closed, swept with oxygen-free nitrogen, and then evacuated. The contents are agitated and mixed monoolefin-carbon monoxide gas is admitted under pressure. The amount of mixed monoolefin-carbon monoxide gas admitted is so regulated that the desired pressure will be developed at reaction temperature. The pressure is maintained at the selected level throughout the period of reaction by intermittent addition of mixed monoolefin-carbon monoxide gas. After reaction is complete, as evidenced by cessation of pressure drop, the reactor is permitted to cool, it is opened and its contents are discharged. The desired reaction product is isolated from the reaction mixture by distillation or other means known to those skilled in the art.

By "monoolefin" as the term is used herein is meant hydrocarbons of the general formula $C_nH_{2n}$, i. e. hydrocarbons containing an ethylenic double bond as the sole carbon-to-carbon unsaturation.

The examples which follow are submitted to illustrate and not to limit this invention. Parts are by weight, unless otherwise stated.

*Example 1.*—A mixture of 19.8 parts of methanol, 39.8 parts of carbon tetrachloride, 34 parts of ethylene and 0.10 part of di-t-butyl peroxide is placed in a silver-lined agitated pressure vessel and heated for 3.5 hours at 130° C. under a carbon monoxide pressure of 2800 to 3000 atmospheres. The reaction mixture is distilled and two product-fractions are obtained. The first, B. P. 78° C. (8 mm.), $n_D^{25}$ 1.4648, $d_4^{25}$ 1.3645, amounts to 6.6 parts by weight. It has the composition of methyl 4,4,4-trichlorobutanoate.

*Anal.*—Calcd. for $C_5H_7Cl_3O_2$: C, 29.2; H, 3.4; Cl, 51.8; Methoxyl, 15.1. Found: C, 29.8; H, 4.0; Cl, 51.5; Methoxyl, 15.2.

This structure is confirmed by hydrolysis experiments. Concentrated sulfuric acid converts the compound to succinic acid, M. P. 186–187° C. alone or mixed with an authentic sample. Concentrated hydrochloric acid converts it to 4,4,4-trichlorobutanoic acid, M. P. 51–52° C. alone or mixed with an authentic sample (Bruson, Neiderhauser, Rienier and Hester, J. Am. Chem. Soc., 67, 601 (1945)). Finally, methanol and succinic acid can be identified as products of sodium hydroxide hydrolysis.

The second fraction, B. P. 74–88° C. (0.2 mm.), 2.2 parts by weight, is methyl 6,6,6-trichlorohexanoate mixed with a little methyl 8,8,8-trichlorooctanoate. In addition, there is obtained 11.6 parts of residue which does not distill when heated to 170° C. (0.2 mm.).

*Example 2.*—A mixture of 0.78 part of methanol, 0.50 part of ethylene, 1.0 part of carbon monoxide, 1.52 parts of carbon tetrachloride and 0.02 part of di-t-butyl peroxide is heated in a stainless steel vessel at 130° C. and a pressure of 6800 and 8000 atm. for 17 hours. The mixture is cooled to 25° C. and unused gas is bled off. Infrared analysis shows that the gas contains methyl chloride and methyl ether besides carbon monoxide and ethylene. Distillation of the liquid portion of the product gives 0.50 part of a mixture of methyl $\omega,\omega,\omega$-trichloroalkanoates, B. P. 70–144° C. (7 mm.).

*Example 3.*—A mixture of 60 parts of methanol, 80 parts of carbon tetrachloride, and 1 part of di-t-butyl peroxide is placed in a silver-lined pressure vessel and heated at 135° C. for 8 hours under 900 to 1000 atm. pressure of 1:1 ethylene/carbon monoxide gas mixture. The product is heterogeneous; 17 parts of methanol and water are recovered and the lower layer of 110 parts is distilled under reduced pressure. From this, there are obtained the following products: 8.1 parts of methyl 4,4,4-trichlorobutanoate, B. P. 73–74° C. (5 mm.), $n_D^{25}$ 1.4640; 20.0 parts of methyl 6,6,6-trichlorohexanoate, B. P. 105.5–107.5° C. (5 mm.), $n_D^{25}$ 1.4680.

*Anal.*—Calcd. for $C_7H_{11}O_2Cl_3$: C, 36.2; H, 4.75; Cl, 45.6; M. W. 233. Found: C, 37.29, 37.71; H, 5.72, 5.44, 5.63; Cl, 46.00, 45.62; M. W. 216, 208.

An additional 1.8 parts of methyl 8,8,8-trichlorooctanoate boils at 77–84° C. (0.5 mm.), $n_D^{25}$ 1.4665.

*Anal.*—Calcd. for $C_9H_{15}O_2Cl_3$: C, 41.4; H, 5.37; Cl, 40.7; M. W. 261. Found: C, 40.42, 40.29; H, 5.80, 5.71; Cl, 42.70, 42.92; M. W. 212, 218.

The structures of these latter two compounds can be demonstrated by hydrolysis with concentrated sulfuric acid to the known adipic and suberic acids, respectively. About 20 parts of undistillable residue is also obtained.

*Example 4.*—A mixture of 105 parts of carbon tetrachloride, 50 parts of water and 1 part of di-t-butyl peroxide is heated at 135° C. under 900–1000 atm. pressure of a 1:1 ethylene/carbon monoxide gas mixture. There is obtained 27.8 parts of volatile product, B. P. 61–120° C. (1 mm.) which is completely soluble in dilute aqueous sodium bicarbonate. This fraction is apparently a mixture of chlorine-containing carboxylic acids. The residue which decomposes on further attempts at distillation comprises 40 parts.

*Example 5.*—Chloroform (60 parts), methanol (32 parts), and di-t-butyl peroxide (2 parts) are heated at 130–135° C. in a silver-lined pressure vessel under 900–1000 atm. pressure of a 1:1 ethylene/carbon monoxide gas mixture for 8 hours. After removal of the excess solvent, the distillable product, B. P. 40–125° C. (1 mm.), amounts to 3 parts; there is also obtained an unstable residue which amounts to 15 parts. That the distillate contains an aldehyde group is shown by the precipitation of metallic silver from an ammoniacal silver hydroxide solution, and the formation of a 2,4-dinitrophenylhydrazone, M. P. 105–106° C. This derivative contains chlorine.

*Example 6.*—A solution of 2.0 parts of di-t-butyl peroxide in 42 parts of ethyl mercaptan is placed in a 180-ml. silver-lined steel shaker tube previously flushed with nitrogen. The head of the tube is screwed on and 21 parts of ethylene is added from a cylinder of ethylene under a pressure of 1000 lb./sq. in. Carbon monoxide is introduced until the pressure is 2000 atm. and the tube is then heated, with continuous shaking, at 130° C. The carbon monoxide pressure is increased to 3000 atm. and is maintained at 2900–3000 atm. for 3.5 hours, during which time a total pressure drop of 500 atm. is observed.

The tube is cooled to 25° C., gas is bled off, the liquid product is poured out, and the tube is rinsed with 19.8 parts of methanol. The product and methanol-rinse are combined and distilled through a short Vigreux column. Low-boiler is partially stripped off by heating the still-pot to 100° C. at atmospheric pressure. Two main fractions are obtained on vacuum distillation. The first, 9.1 parts, B. P. 70–71° C. (13 mm.), $n_D^{25}$ 1.4755, is β-ethylmercaptopropionaldehyde. It forms a 2,4-dinitrophenylhydrazone which melts at 106–107° C. after recrystallization from cyclohexane-benzene mixtures. For purposes of comparison, the same aldehyde is prepared from ethyl mercaptan and acrolein as described by Catch, Cook, Graham and Heilbron, J. Chem. Soc. 1609 (1947). The 2,4-dinitrophenylhydrazone of β-ethylmercaptopropionaldehyde from this source also melts at 106–107° C., as does a mixture of the two hydroazones, thus definitely proving the structure of the aldehyde of B. P. 70–71° C. (13 mm.).

*Analysis of hydrazone.*—Calcd. for $C_{11}H_{14}N_4O_4S$: C, 44.3; H, 4.7. Found: C, 44.3, H, 4.71.

The second fraction is 5.4 parts of a sulfur-containing compound of B. P. 113–114° C. (0.9 mm.), $n_D^{25}$ 1.5274. During the distillation low-boiler collects in a trap immersed in a mixture of Dry Ice and acetone. It is combined with the low-boiler obtained by preliminary stripping, and the resultant mixture is washed with twice its volume of water to remove methanol. A second washing with an equal volume of water to remove last traces of methanol is followed by fractionation. There is obtained in this way 2.2 parts of ethyl mercaptan, B. P. 34–40° C., and 26.1 parts of diethyl sulfide, B. P. 91–92° C.

Under the same conditions except that 0.5 part of α,α'-azodiisobutyronitrile is substituted for di-t-butyl peroxide and the reaction temperature is 75–80° C. instead of 130° C., 3.2 parts of β-ethylmercaptopropionaldehyde is isolated. Under the same conditions except that 3.0 parts of cobalt tetracarbonyl is substituted for di-t-butyl peroxide, a quite different reaction takes place, the product being 0.70 part of diethyl ketone and 33.2 parts of ethyl thiolpropionate, B. P. 136–137° C., $n_D^{25}$ 1.4568.

*Anal.*—Calcd. for $C_5H_{11}OS$: C, 50.8; H, 8.4; S, 27.1. Found: C, 50.5; H, 8.6; S, 27.3.

*Example 7.*—The procedure of Example 6 is applied to a mixture of 21 parts of ethyl mercaptan, 11 parts of ethylene, 20 parts of methanol and 0.8 part of di-t-butyl peroxide. The pressure in the reaction vessel is kept at 900–1000 atm. with carbon monoxide. The main products are 8.6 parts of β-ethylmercaptopropionaldehyde and 13.9 parts of diethyl sulfide. Small amounts of higher-boiling aldehydes or ketones also are formed. Similar results are obtained when the experiment is repeated at 3000 atm. and 8000 atm.

*Example 8.*—The procedure of Example 6 is applied to a mixture of 21 parts of ethyl mercaptan, 21 parts of diethyl sulfide, 12 parts of ethylene and 1.6 parts of di-t-butyl peroxide under a carbon monoxide pressure of 2900–3000 atm. Distillation as before gives 20.8 parts of diethyl sulfide, 12.7 parts of β-ethylmercaptopropionaldehyde and 3.7 parts of the same higher-boiling substance obtained in Example 6.

*Example 9.*—A mixture of 42 parts of methyl mercaptan, 29 parts of ethylene and 1.6 parts of di-t-butyl peroxide is heated for 2.3 hours in a silver-lined shaker-tube at 130° C. under a carbon monoxide pressure of 2900–3000 atm. The products, worked up as in Example 6, consist of 19.8 parts of ethyl methyl sulfide, B. P. 66–68° C., $n_D^{25}$ 1.4361, and 16.2 parts of β-methylmercaptopropionaldehyde, B. P. 65–69° C. (14 mm.), $n_D^{25}$ 1.4813. Small quantities of higher-boiling oils also are obtained. The 2,4-dinitrophenylhydrazone of the aldehyde melts at 120–121° C. alone or mixed with that of a sample of β-methylmercaptopropionaldehyde prepared from acrolein and methyl mercaptan (Catch, Cook, Graham and Heilbron, J. Chem. Soc., 1609 (1947)).

*Example 10.*—A mixture of 42 parts of ethyl mercaptan, 31 parts of propylene and 2.0 parts of di-t-butyl peroxide is shaken for 2.3 hours at 130° C. under a carbon monoxide pressure of 2900–3000 atm. The reaction mixture is worked up as in Example 6. The principal products are 35.6 parts of ethyl n-propyl sulfide, B. P. 113–115° C., $n_D^{23}$ 1.442, and 14.2 parts of β-ethylmercaptoisobutyraldehyde, B. P. 72–75° C. (10 mm.), $n_D^{25}$ 1.468, $d_4^{25}$ 0.73. β-ethylmercaptoisobutyraldehyde can also be prepared by the addition of ethyl mercaptan to α-methylacrolein in the presence of a trace of triethylamine. β-ethylmercaptoisobutyraldehyde from either source forms the same 2,4-dinitrophenylhydrazone, M. P. 78–79.5° C. after crystallization from ethanol.

*Anal.*—Calcd. for $C_{12}H_{16}N_4O_4S$: S, 10.3; N, 17.9. Found: S, 10.5; N, 17.7.

*Example 11.*—A mixture of 16 parts of 1-hexene, 22 parts of 1-hexanethiol and 2.0 parts of di-t-butyl peroxide is agitated for 3.5 hours at 130° C. under a carbon monoxide pressure of 2900–3000 atm. The reaction tube is cooled and vented. Distillation of the liquid contents of the tube through a short Vigreux column gives the following three fractions: A, 4.4 parts, B. P. 38–45° C./13 mm., $n_D^{25}$ 1.449 (unchanged 1-hexanethiol); B, 14.0 parts, B. P. 132–146° C. (13 mm.), $n_D^{25}$ 1.458 (mainly dihexyl sulfide, but contaminated with alpha-butyl-beta-(hexylmercapto)propionaldehyde,

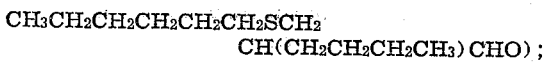

and C, 5.4 parts, B. P. 146–163° C. (13 mm.), $n_D^{25}$ 1.470 (alpha-butyl-beta-(hexylmercapto)proprionaldehyde contaminated with dihexyl sulfide). Fraction C gives a positive test for aldehyde with fuchsin reagent. With 2,4-dinitrophenylhydrazine C gives alpha-butyl-beta-(hexylmercapto)propionaldehyde 2,4-dinitrophenylhydrazone, M. P. 69–70.5° C. after crystallization from 95% ethyl alcohol. A qualitative test shows that the hydrazone contains sulfur.

*Anal.*—Calcd. for $C_{19}H_{30}N_4O_4S$: C, 55.6; H, 7.4. Found: C, 55.4; H, 7.4.

*Example 12.*—A mixture of 50 parts of dimethyl adipate, 40 parts of methanol, and 1 part of alpha,alpha'-azodicyclohexanecarbonitrile is heated at 110° C. for 8 hours under 900–1000 atm. pressure of a 1:1 ethylene/carbon monoxide gas mixture. Twenty-two parts of dimethyl adipate are recovered. There is also obtained 56.7 parts of a cream-colored solid, M. P. 96–116° C. This material possesses many properties similar to those of Carnauba wax.

*Anal.*—Found: C, 65.92, 65.73; H, 8.76, 8.92; Methoxyl, 2.30, 12.55, 10.43, 7.90; M. W. 1500, 910; Shore Hardness, 98.

Other methyl esters, notably methyl propionate and methyl isobutyrate, similarly yield wax-like products in the molecular weight range of 500 to 6000 at temperatures from 100–160° C. and an ethylene/carbon monoxide mixed gas pressure of 900–1000 atm.

*Example 13.*—In order to obtain distillable products from the less active chain transfer agents by the process of this invention, it is necessary to employ lower operating pressures than those in the previous examples. This is illustrated below:

Methyl ethyl ketone (480 parts) and di-t-butyl peroxide (50 parts) are placed in a stainless steel pressure vessel under 1000 lb./sq. in. pressure of a 60:40 ethylene/carbon monoxide gas mixture and heated at 135° C. for 15 hours. The reactor is cooled, vented, and the solvent is removed by distillation at atmospheric pressure. The residue (184 parts) is distilled at 3 mm. pressure. The 30 parts of distillate obtained is refractionated by means of a precision still; 9 parts of 3-methyl-2,4-octandione is isolated (30% of distillable product, 5% of total product), B. P. 78–82° C. (2 mm.).

*Anal.*—Calcd. for $C_9H_{16}O_2$: C, 69.4; H, 10.3; M. W. 156. Found: C, 69.87, 69.91; H, 10.64, 10.49; M. W. 156, 153.

A positive iodoform test indicates that the product is a methyl ketone and treatment with 2,4-dinitrophenylhydrazine leads to a substituted pyrazole, M. P. 163–164° C., confirming the β-diketone structure.

*Anal.*—Calcd. for $C_{15}H_{18}N_4O_4$: C, 56.6; H, 5.7; N, 17.6. Found: C, 56.68; H, 5.72; N, 18.09.

From the same reaction mixture there is also obtained 3-methyl-2-heptanone, B. P. 69–71° C. (10 mm.).

*Anal.*—Calcd. for $C_8H_{16}O$: C, 74.9; H, 12.3; M. W. 128. Found: C, 74.45, 74.31; H, 12.24, 12.20; M. W. 146.

3-methyl-2,4-decandione, B. P. 103° C. (17 mm.) is also isolated in 9% yield (N. B. 7169–63).

*Anal.*—Calcd. for $C_{11}H_{20}O_2$: C, 71.0; H, 11.8. Found: C, 70.39, 70.74; H, 10.90, 11.01.

*Example 14.*—In experiments carried out as described in Example 13 but at 200–300 lb./sq. in. pressure, about 20% of the product is 3-methyl-2,4-hexandione, B. P. 88–88.5° C. (16 mm.).

*Anal.*—Calcd. for $C_7H_{12}O_2$: C, 65.6; H, 9.38. Found: C, 66.89; H, 10.3.

When treated with phenylhydrazine, this material is converted into the corresponding pyrazole, M. P. 125–126° C.

*Anal.*—Calcd. for $C_{13}H_{16}N_2$: C, 78.0; H, 8.0; N, 14.0. Found: C, 77.76; H, 8.50; N, 14.02, 14.13.

Occasionally, products are isolated in low yield which appear to contain catalyst fragments; in this case, methyl radicals arising from the di-t-butyl peroxide. Products such as 3-methyl-2-hexanone appear to be of this nature, B. P. 55° C. (17 mm.).

*Anal.*—Calcd. for $C_7H_{14}O$: C, 73.6; H, 12.28. Found: C, 74.08, 73.99; H, 12.63, 12.33.

*Example 15.*—In a manner exactly similar to Example 13, methyl isopropyl ketone is utilized as the chain transfer solvent. From 400 parts of methyl isopropyl ketone, 50 parts of di-t-butyl peroxide and a 1:1 ethylene/carbon monoxide gas mixture at 1000 lb./sq. in. pressure and 135° C. for 15 hours, a volatile liquid (18.4 parts) and a viscous residue (76.9 parts) are obtained, after removal of unchanged solvent. From the volatile liquid, there is obtained 5.2 parts of a diketone believed to be 3,3-dimethyl-2,4-octandione, B. P. 90–91° C. (8 mm.).

*Anal.*—Calcd. for $C_{10}H_{18}O_2$: C, 70.7; H, 10.6; M. W. 170. Found: C, 71.48, 71.52; H, 10.88, 10.97; M. W. 150.

This material is oxidized by sodium hypoiodite with the formation of iodoform, indicating a methyl ketone, and forms a bis(2,4-dinitrophenyl hydrazone), M. P. 245–246° C.

*Anal.*—Calcd. for $C_{22}H_{26}N_8O_8$: C, 49.9; H, 4.91; N, 21.2. Found: C, 50.22; H, 5.13; N, 21.66.

Other methyl ketones such as acetone and methyl isobutyl ketone, of course, lead to similar products.

*Example 16.*—A mixture of 50 parts of ethylene chloride and 0.7 part of acetyl peroxide is placed in a silver-lined pressure reactor.

Thereafter, there is added 20 parts of chlorine, the reactor pressured to 200 atmospheres with carbon monoxide, and then to 350 atmospheres by injecting 150 atmospheres of ethylene. The reactor is then closed and heated to between 75° and 130° C. for 5 hours. The reactor is permitted to cool, then is opened and the contents discharged. The products from four similar runs are combined, and the solvent is boiled off at atmospheric pressure. Twenty-one parts of impure ethylene chloride is isolated, and three higher boiling fractions are obtained: (a) B. P. 42–56° C. (62 mm.), 4 parts; (B) B. P. 66–74° C. (62 mm.), 2 parts; (C) B. P. 65–102° C. (3 mm.), 3 parts. Fraction B can be shown to contain beta-chloropropionyl chloride by allowing it to react with aniline in the manner described by Cheronis and Entrikin (Semimicro Qualitative Organic Analysis, Thomas Y. Crowell, New York, 1947, page 213). The anilide melts at 116–117° C. alone or when mixed with an authentic sample of beta-chloropropion-anilide. The compositions of the other fractions are not known.

*Example 17.*—A 10/1 mole ratio mixture of ethylene and carbon monoxide is prepared by pressuring a 2500 cc. reservoir cylinder to 445 lb./sq. in. with carbon monoxide and injecting ethylene to a final pressure of 200 atm. This premixed gas is displaced continuously at a rate of 320 parts per hour by water metered from a high-pressure piston-pump. Simultaneously, a separate stream comprising 0.628% di-t-butyl peroxide in dioxolane is pumped at a rate of 1275 parts per hour with a second high-pressure metering pump. These two streams are combined in a mixing block and pumped through a reactor coil comprising 120 ft. of ¼" x ⅛" stainless steel tubing immersed in an oil bath at 175° C. The flow rates are calculated to permit a contact time of 9 minutes with a feed comprising 0.5% of di-t-butyl peroxide, 20% mixed gas and 79.5% dioxolane. At the end of the unit, the product is discharged through a high pressure valve controlled manually to maintain a constant pressure of 200 atm. in the reactor. The effluent is received in a liquid gas separator arranged for bottom discharge of liquid material while unreacted gases are expanded from the top.

The products are pale yellow liquids collected at a rate of 1300 parts per hour. The polymeric products are isolated from these solutions by stripping of the dioxolane solvent under reduced pressure on a steam bath. From each hour's operation, there is obtained an average of 154 parts of a viscous liquid polymer. These products are found to contain 73.7% ethylene and 26.3% CO calculated by carbon-hydrogen analysis. The average molecular weight is 350. In addition to polymer, there are obtained volatile liquid fractions. From these volatile fractions there is isolated in 6% yield material which appear to be 2-ketooctanal ethylene glycol acetal, formed from three ethylene units, carbon monoxide and one dioxolane unit; B. P. 85–86° C. (5 mm.), $n_D^{25}$ 1.4304.

*Anal.*—Calcd. for $C_{10}H_{18}O_2$: C, 64.5; H, 9.7; M. W. 186. Found: C, 64.95; H, 10.51; M. W. 160, 169.

The next higher homolog, 2-ketodecanal ethylene glycol acetal, can be isolated as 10% of the distillate, B P. 81–82° C. (0.4 mm.), $n_D^{25}$ 1.4416.

*Anal.*—Calcd. for $C_{12}H_{22}O_3$: C, 67.4; H, 10.3; M. W. 214. Found: C, 67.61; H, 10.91; M. W. 202.

A homolog formed from five ethylene units, carbon monoxide, and one dioxolane unit, is obtained in 13.6% yield (based on distillable product); B. P. 101–102° C. (0.5 mm.), $n_D^{25}$ 1.4445.

*Anal.*—Calcd. for $C_{14}H_{26}O_3$: C, 69.5; H, 10.6; M. W. 242. Found: C, 69.42; H, 10.95; M. W. 232.

*Example 18.*—A gas mixture comprising 20% propylene, 60% ethylene and 20% CO is prepared by charging the 2500 cc. reservoir cylinder with 187.2 parts of propylene and pressuring first to 1085 lb./sq. in. with CO and finally to a total of 200 atm. with ethylene. This mixture is displaced by water at a rate of 213 parts per hour. A separate stream comprising 1.35% di-t-butyl peroxide in dioxolane is pumped at a rate of 852 parts per hour. These streams are combined in a mixing block and pumped through the unit at 190° C. and 200 atm. pressure. The product, a pale yellow solution of polymer in dioxolane solvent, is collected at an average rate of 800 parts per hour. After stripping of the dioxolane, there remain an average of 77.4 parts of a yellow grease-like product from each hour's operation, corresponding to 36.3% conversion based on total monomer. This material has an average molecular weight of 330 and is comprised of 34.2% CO and 65.8% of olefin components.

In addition to polymer, there is obtained volatile material which is subjected to fractional distillation by means of a ¾" x 14" column packed with stainless wire gauze saddles. The compounds isolated are of the following type:

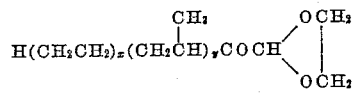

The absolute configuration of each compound is not known. The following compounds are isolated.

As approximately 7% of the distillate, a compound is isolated corresponding to the structure in which $x=1$, $y=1$; B. P. 94–97° C. (16 mm.).

*Anal.*—Calcd. for $C_9H_{19}O_3$: C, 62.8; H, 9.4; M. W. 172. Found: C, 61.48; H, 10.76; M. W. 176, 175.

As 15% of the distillate, a compound is isolated corresponding to the structure in which $x=2$, $y=1$; B. P. 115–118° C. (19 mm.).

*Anal.*—Calcd. for $C_{11}H_{20}O_3$: C, 66.0; H, 10.0; M. W. 200. Found: C, 66.84; H, 10.73; M. W. 206, 201.

A compound corresponding to the type structure in which $x=1$, $y=2$, or $x=4$, $y=0$, is obtained representing 3% of the distillate. It boils at 102–103° C. (4 mm.).

*Anal.*—Calcd. for $C_{12}H_{22}O_3$: C, 66.8; H, 11.1; M. W. 216. Found: C, 66.27; H, 10.93; M. W. 224, 232.

A fraction boiling at 117–118° C. (4 mm.) (7% of the distillate) is obtained whose structure appears to correspond to $x=0$, $y=3$, or $x=3$, $y=1$.

*Anal.*—Calcd. for $C_{13}H_{24}O_3$: C, 68.5; H, 10.5; M. W. 228. Found: C, 68.26; H, 10.79; M. W. 217, 229.

An isomer of the above fraction is obtained as 6% of the distillate. It boils at 119–121° C. (4 mm.). This product is assumed to possess minimum chain-branching as evidenced by its higher boiling point.

*Anal.*—Found: C, 68.87; H, 10.99; M. W. 195, 200.

A fraction corresponding to 5% of the volatile material is obtained boiling at 121–125° C. (4 mm.). The material corresponds to the type of structure in which $x=5$, $y=0$, or $x=2$, $y=2$.

Anal.—Calcd. for $C_{14}H_{26}O_3$: C, 69.4; H, 10.7; M. W. 242. Found: C, 69.12; H, 11.29; M. W. 250, 244.

The process of this invention can be carried out with a mixture of any polymerizable aliphatic monoolefin hydrocarbon, carbon monoxide and a chain transfer agent. Preferred monoolefin hydrocarbons are those containing from 2 to 4 carbon atoms, examples of which are ethylene, propylene and the butylenes.

Catalysts which are useful in the practice of this invention are those which are capable of yielding free radicals under the conditions of reaction. They are substances which are effective in the homopolymerization of ethylene to solid polymers. Examples are azo compounds containing an acyclic azo (—N=N—) group having bonded to nitrogen a discrete carbon atom of the class consisting of aliphatic and cycloaliphatic carbon atoms, at least one of said discrete carbon atoms being tertiary and one of the carbon atoms bonded to said tertiary carbon atom having its remaining valences satisfied by only elements of the class consisting of oxygen and nitrogen. These compounds are more fully described in the copending application of Madison Hunt, U. S. Serial No. 2,551, filed January 15, 1948, now U. S. P. 2,471,959. Illustrative of such compounds are alpha,alpha'-azobis(alpha,gamma-dimethylvaleronitrile), dimethyl- and diethyl alpha,-alpha'-azodiisobutyrate, 1,1'-azodicyclohexanecarbonitrile, alpha,alpha' - azobis(alpha-ethylbutyronitrile), alpha,alpha' - azodiisobutyrocarbonamide, alpha(carbamylazo)isobutyronitrile, etc. Examples of other compounds operable as catalysts in the process of this invention are azines, oximes, amine oxides, peroxy compounds such as organic peroxides, peroxy salts, hydroperoxides, percarboxylates, etc., for example, benzoyl peroxide, diethyl peroxide, t-butyl pentamethyl peroxide, di-t-butyl peroxide, sodium, potassium and ammonium persulfates, t-butyl hydroperoxide, ethyl hydroperoxide, benzalazine, diphenylketazine, hydrazine hydrochloride, dibenzoyl hydrazine, acetoxime, camphoroxime, trimethylamine oxide, etc.

Combinations of two or more of the above catalysts may be used, if desired.

The concentration of catalyst may be varied over a wide range. For reasons of economy, it is desirable to use as small an amount of catalyst as possible, for example, 0.01% by weight of the polymerizable monomers present in the charge. If desired, larger amounts in the range of from 1% to 15% may be used.

In the process of this invention pressures ranging from slightly above atmospheric up to 20,000 atmospheres or higher may be employed. Generally, however, pressures of from 20 to 12,000 atmospheres are used.

The mole ratio of carbon monoxide to monoolefin in the gas charge may be varied from 99:1 to 1:99 and the mole ratio of total gas charge to chain transfer agent may be varied between 10:1 and 1:10.

The process may be operated at temperatures in excess of 25° C. Generally, however, temperatures above 250° C. are not employed. As a rule, the reaction takes place at a reasonable rate at temperatures of from 50° to 200° C., and that therefore represents the preferred operating temperature range.

The chain transfer agents employed are, in general, organic or inorganic substances, defined hereinabove, examples of which are:

(1) Halogenated derivatives of aliphatic hydrocarbons such as carbon tetrachloride, chlorinated ethylene polymers, chloroform, methylene chloride, iodoform, methyl bromide, ethyl bromide, 1,1,1-trichloroethane, etc.

(2) Chlorine, bromine, etc.

(3) Esters of aliphatic acids carrying halogen substituents on the carbon alpha to the carboxyl groups, e. g., methyl-alpha-bromoisobutyrate, ethyl alpha-chloropropionate, etc.

(4) Ketones with a hydrogen on a carbon alpha to the keto group, e. g., dimethyl ketone, methyl ethyl ketone, methyl isopropyl ketone, methyl isobutyl ketone, diethyl ketone, etc.

(5) Ethers which have a hydrogen on a carbon alpha to the ether oxygen, e. g., diethyl ether, ethyl isopropyl ether, dioxolane, etc.

(6) Hydrogen sulfide, thiols, mercapto acids, and thiolic acids, e. g., methyl mercaptan, ethyl mercaptan, hexyl mercaptan, octyl mercaptan, 1,2-ethanedithiol, 1,4-butanedithiol, 1,10-decanedithiol, cyclohexanethiol, etc., mercaptoacetic acid, beta-mercaptopropionic acid, gamma-mercaptobutyric acid, 6-mercaptohexanoic acid, etc., thiolacetic acid, thiolbutyric acid, etc.

(7) Hydrogen halides such as hydrogen chloride, hydrogen bromide, etc.

(8) Alkali metal and amine salts of sulfurous acid, e. g., sodium and potassium bisulfites, amine bisulfites, etc.

(9) Alkyl phosphites, e. g., diethyl and dipropyl phosphites, dicresyl phosphite, etc.

(10) Hydrocarbons containing secondary and tertiary carbon atoms, e. g., cyclohexane, isopropyl benzene, isobutane, etc.

(11) Silanes having an

bond, e. g., $HSiCl_3$.

The process of this invention can be carried out with only the reactants and catalyst, i. e., with only the monoolefin, carbon monoxide, and chain transfer agent and catalyst or it can be carried out in the presence of a diluent which can be inert or which can function also as a reactant, for example, an alcohol or water. Thus, when carbon tetrachloride, ethylene and carbon monoxide are reacted together in methanol or water, the initial product, an acid chloride, reacts further with the methanol or water so that the final product is a methyl ester or carboxylic acid, respectively. The inert diluent can be a gas such as nitrogen or it can be a liquid such as benzene.

Although oxygen in small amounts can, in the absence of other materials, act as a catalyst for the reaction, its presence in large concentrations is to be avoided because it has a deleterious effect on the reaction.

The reaction can be carried out in any kind of pressure equipment made of or lined with materials capable of withstanding corrosion. Such lining materials as stainless steel, silver, nickel, and aluminum are particularly useful. Chromium-vanadium steels and other corrosion-resistant alloys can also be used.

It is sometimes desirable to add one or two of the reactants to the system as the reaction proceeds. This can be done by injection, by means well known to those skilled in the art. It is also feasible to add the catalyst as the reaction progresses. This can be done by injecting a solution of the catalyst in one of the reactants or in an inert diluent. This procedure is advantageous in those cases where the reaction takes place very rapidly. In such instances, portion-wise or slow addition of the catalyst to the system facilitates control of the reaction and generally leads to higher yields of desired products.

It is within the scope of this invention to carry out the reaction in a continuous flow system. For example, a mixture of reactants and catalyst can be passed continuously through a reaction zone which is maintained under reaction conditions of temperature. Alternately, the catalyst can be injected into the system which is passing through the reaction zone. In some instances advantage may be gained by adding one of the reactants to the mixture in the reaction zone. This is true where the reaction is so rapid as to cause a marked change in concentration in one of the reactants. Continuous operation possesses many technical advantages such as economy, accurate control of reaction, and flexibility. By continuous operation, a constant ratio of reactants can be maintained during the reaction, if so desired.

From the very broad nature of the reaction of this invention, it is evident that the products obtained are open to a very large number of uses. By way of illustration, the products obtained by reacting ethylene with carbon monoxide, and carbon tetrachloride are $\omega,\omega,\omega$-trichloroalkanoic acid chlorides and hence usefully employable as intermediates for the preparation of esters, acids, etc., for plasticizers, solvents, polyamides, and the like. The product obtained by reaction of ethylene with carbon monoxide and ethyl mercaptan can be pyrolyzed to acrolein, thus opening up a new route to this very interesting unsaturated aldehyde. The product from methyl mercaptan, ethylene and carbon monoxide can be converted by the Strecker reaction to the essential amino acid, methionine. The aldehyde obtained from propylene, carbon monoxide and a mercaptan, $R \cdot S \cdot CH_2 \cdot CH \cdot (CH_3) \cdot CHO$, can be converted to methyl methacrylate by oxidation of the aldehyde to the corresponding acid, esterification of the acid with methanol to

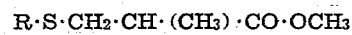

$R \cdot S \cdot CH_2 \cdot CH \cdot (CH_3) \cdot CO \cdot OCH_3$ and elimination of a molecule of mercaptan, RSH, from the ester.

I claim:

1. The process which comprises interreacting carbon monoxide with a monoolefin hydrocarbon and with a reactant of the class consisting of halogens, haloalkanes, ketoalkanes having at least one hydrogen on a carbon alpha to the keto group, ethers having at least one hydrogen on a carbon alpha to the ether oxygen, thiol compounds, and esters of aliphatic acids having hydrogen on a carbon alpha to carboxyl, in the presence of a substance which generates free radicals under the prevailing reaction conditions, at a temperature above 25° C., under superatmospheric pressure, and thereafter separating from the resulting mixture the product obtained by the interreaction of the said carbon monoxide, monoolefin and said reactant.

2. The process which comprises interreacting carbon monoxide with a monoolefin hydrocarbon having from two to four carbon atoms per molecule, and with a reactant of the class consisting of halogens, haloalkanes, ketoalkanes having at least one hydrogen on a carbon alpha to the keto group, ethers having at least one hydrogen on a carbon alpha to the ether oxygen, thiol compounds, and esters of aliphatic acids having hydrogen on a carbon alpha to carboxyl, in the presence of a substance which generates free radicals under the prevailing reaction conditions, at a temperature above 25° C., under superatmospheric pressure, and thereafter separating from the resulting mixture the product obtained by the interreaction of the said carbon monoxide, monoolefin and said reactant.

3. A process which comprises interreacting carbon monoxide with ethylene and with a reactant of the class consisting of halogens, haloalkanes, ketoalkanes having at least one hydrogen on a carbon alpha to the keto group, ethers having at least one hydrogen on a carbon alpha to the ether oxygen, thiol compounds, and esters of aliphatic acids having hydrogen on a carbon alpha to carboxyl, in the presence of a catalyst which is effective in the homopolymerization of ethylene to solid polymers, in the absence of a Friedel-Crafts catalyst, at a temperature within the range of 25° to 250° C. under a pressure within the range of 20 to 12,000 atmospheres, and thereafter separating from the resulting mixture the product obtained by the interaction of the said carbon monoxide, ethylene and said reactant.

4. The process which comprises interreacting carbon monoxide with ethylene, a hydroxyalkane, and a chloroalkane, in the presence of a substance which generates free radicals under the prevailing reaction conditions, at a temperature above 25° C., under superatmospheric pressure, and thereafter separating from the resulting mixture the product obtained by the interreaction of the said carbon monoxide, ethylene, hydroxyalkane, and said chloroalkane.

References Cited in the file of this patent

UNITED STATES PATENTS

| Number | Name | Date |
| --- | --- | --- |
| 2,396,963 | Mortenson | Mar. 19, 1946 |
| 2,495,286 | Brubaker | Jan. 24, 1950 |
| 2,557,256 | Brubaker | June 19, 1951 |

FOREIGN PATENTS

| Number | Country | Date |
| --- | --- | --- |
| 583,172 | Great Britain | Dec. 11, 1946 |

OTHER REFERENCES

Flory, J. Am. Chem. Soc. 59, pp. 241–253, February 1937.

Mayo, J. Am. Chem. Soc. 65, pp. 2324–2329, December 1943. (Presented before Organic Div. of Detroit Meeting ACS 4/12/43.)

Snyder et al., J. Am. Chem. Soc. 68, pp. 1422–31, August 1946.

Price, "Mechanisms of Reactions at Carbon-Carbon Double Bonds," Interscience Publishers, Inc. (1946), pages 82 to 85.